UNITED STATES PATENT OFFICE.

HENRY PEMBERTON, OF EAST TARENTUM, PENNSYLVANIA.

IMPROVEMENT IN MANUFACTURE OF COMMON SALT.

Specification forming part of Letters Patent No. 24,951, dated August 2, 1859.

*To all whom it may concern:*

Be it known that I, HENRY PEMBERTON, of East Tarentum, in the county of Allegheny and State of Pennsylvania, have invented a new and Improved Process for the Manufacture of Common Salt; and I do hereby declare the following to be a full, clear, and exact description thereof.

My invention consists in the combination of processes, hereinafter described, for purifying common salt after it has been produced by evaporation, by passing through it a saturated solution of pure chloride of sodium, which is obtained by using brine previously deprived of deliquescent salts and other foreign substances or ingredients, whereby the impurities in the salt (being soluble in brine) are taken up by the brine, and thus removed from the salt, the salt remaining undissolved, because the brine is already a saturated solution, the brine used in this process, whether resulting from the above-stated process of treating salt or produced by making a saturated solution of common impure salt, being purified for this purpose with proper chemical agents hereinbefore named, whereby the same brine may be repeatedly used for an indefinite period, for the purification of common salt.

The process of manufacturing common salt, as ordinarily practiced in the United States, is first to remove any oxide of iron and other insoluble impurities from the brine by adding to it a small quantity of milk of lime, and then permitting it to stand in a suitable vessel until the insoluble impurities are precipitated, after which the clear brine is drawn off into large flat pans, in which it is evaporated, either by the aid of a furnace or by solar evaporation, until the greater part of the salt has separated from the bitter or mother water. The salt is then raked out of the pans and allowed to drain, and the bitter water is thrown away. When sufficiently drained, the salt is removed to the salt-house for storage in bulk until packed in barrels or sacks for sale.

Salt thus prepared, although deprived of foreign insoluble substances, still contains a large amount of the chlorides of calcium and magnesium, which were held in solution by the brine. These substances are highly deliquescent salts, the presence of which render it impossible to obtain common salt in a permanently dry state, and unfit it to a greater or less degree for table use. These foreign substances are still more injurious when present in salt used for pickling or salting meat, as they render the meat slimy, covering it with a disgusting scum, and making it tough and tasteless. They also counteract in a great measure the preservative action of the salt, so that meat packed in salt thus prepared must be repacked with salt of foreign manufacture to preserve it, and for the better qualities of meat foreign salt alone is used.

My improved process of refining common salt consists in the mode of removing these deliquescent salts, whereby the salt is rendered absolutely pure, white, and fitted for every use to which salt is applicable, and in so simple and convenient a manner as to add very slightly to the original cost of the impure salt.

To enable others skilled in the art to make use of my improved process, I will proceed to describe it and its mode of operation.

I take the salt, deprived of its insoluble impurities and separated from the mother or bitter water in the usual manner, and instead of storing it, as is customary, in a common salt-house, I place it in salt-houses of a peculiar construction, made of wood or other suitable material. The salt-houses are perfectly water-tight, and are furnished with a false bottom, placed a few inches above the real bottom. This false bottom is perforated with holes, and covered with matting or coarse cloth, to prevent the salt from falling through into the space between the false and real bottom. A faucet is placed in each tank between the false and real bottom. These salt-houses may be made of any convenient size, though the larger the better. The salt being removed from the drainer into these salt-houses, is allowed to accumulate until the salt-houses are filled, and should be allowed to remain there from six to ten days, during which time a large amount of brine drains from the salt, which would otherwise be lost, and runs into a receiver, and thence is returned to the pans, and yields by evaporation a large quantity of salt. After the salt-houses are quite full of salt, and the brine ceases to run from it, the faucet under false bottom is closed and the process of purification of the salt commenced. This consists in passing through the salt in the salt-houses a chemically pure saturated solution of chloride of sodium, or brine deprived of its soluble and insoluble impurities. As the preparation of this solution of chloride of sodium with which the salt is to be washed is an important part of my process, I will proceed to describe it minutely.

I make a sufficient quantity of saturated brine (say about twenty gallons for every barrel of salt to be purified) by dissolving in water the largest quantity of salt which it will hold in solution, using the best and driest salt obtainable. This saturated solution is then placed in a suitable cistern to be deprived of its impurities, which are, of course, the same as existed in the salt from which it is made, being chiefly the chlorides of calcium and magnesium. To effect this purification, I first add to the saturated solution or brine some milk of lime, the quantity of which will depend on the degree of impurity found in the brine, and must be sufficient to convert the chloride of magnesium into chloride of calcium, separating and precipitating hydrate of magnesia. This point is easily ascertained by well-known chemical tests; but should an excess of lime be added it will not prove injurious, as it will remain undissolved. The foreign substances in the brine are now chloride of calcium, hydrate of magnesia, and perhaps some undissolved hydrate of lime. A saturated solution of sulphate of soda, in quantity depending on the amount of chloride of calcium in the brine, but usually about five to ten per cent., is mixed with the brine, which produces a chemical change, the lime formerly existing as chloride of calcium now separating, and the sulphate of soda and chloride of calcium being converted into sulphate of lime and chloride of sodium, the latter remaining, of course, in solution, while the former (sulphate of lime) being insoluble in a saturated solution of common salt, although slightly soluble in water, is precipitated. When this decomposition is complete, which is ascertained by the usual chemical tests, the mixture is allowed to stand, while the precipitates settle at the bottom of the vessel, leaving a clear brine, absolutely free from any trace of lime or magnesia, which is run off into a receiver on a lower level, ready for use in refining the salt.

The precipitate, consisting principally of sulphate of lime, hydrate of lime, and magnesia, is well worth saving, as it forms a valuable manure, especially in localities where plaster is scarce and needed. It is therefore removed from the cistern after the brine is run off, and placed in a shallow box or filter, with a perforated false bottom covered with coarse cloth, over which it is spread evenly to the depth of about six inches, and any remaining brine allowed to drain off. Water is then run on the precipitate in the box to the depth of a few inches, which displaces any brine remaining in the precipitate, without mixing with or diluting it perceptibly. When all remaining brine is run off, which is ascertained by the water running from the filter, the washing is complete, and the precipitate is allowed to drain, and when dry enough is removed from the filter.

In place of sulphate of soda in the purification of the brine, carbonate of soda or soda-ash may be used, but not with the same advantage, because soda-ash is nearly three times as costly as sulphate of soda, and the mixed precipitates of carbonate of lime and magnesia resulting from the process are bulky, gelatinous, amorphous, and almost impossible to wash in the filter, while the mixed precipitate of sulphate of lime and magnesia obtained from the use of sulphate of soda is crystalline and easily washed from the brine surrounding it. The brine thus purified is almost chemically pure chloride of sodium, and may now be used for the refining of the salt, although it may sometimes contain also traces of bromides and of iodides, which, however, are seldom present in sufficient quantity to be detected by the most delicate chemical tests.

The saturated solution of chloride of sodium thus prepared is now pumped into the salt-houses in which the salt is placed, as before described, and passing through the salt and coming into intimate contact with every particle, however minute, it runs into the space in the salt-house under the false bottom. A sufficient quantity of this pure brine is pumped in to cover the salt a few inches in depth, and is allowed to stand five or six hours, after which the cock is opened and the brine allowed to run off into another cistern. As the brine is a saturated solution, the salt in the salt-house is not at all dissolved or carried off by the brine, but the pure brine in passing through the salt carries off in solution the impurities originally existing in the salt, leaving it very nearly pure. The brine, however, having carried off these impurities, again contains a large quantity of the chlorides of calcium and of magnesium, and must be again purified with milk of lime and sulphate of soda, as before described, and is used over and over again after each purification. The process of refining the salt is now repeated, pure brine being a second time pumped onto the salt in the salt-houses, from which it now removes any remaining trace of foreign substances, and renders it almost, if not quite, chemically pure. The brine which passes off from the second washing of the salt will contain so few impurities that it may be used without further purification for the first washing of impure salt; but for the second washing the brine ought to be a chemically pure saturated solution of chloride of sodium.

I stated in the commencement of this specification that in the process of manufacturing salt some milk of lime is added to the brine previously to the evaporation, for the purpose of converting the iron and other foreign substances susceptible of such treatment into insoluble compounds, and removing them by precipitation. Some of this lime, during the process of evaporation or the subsequent storage of the salt, may, by exposure to the atmosphere, and the consequent absorption of carbonic acid, be converted into carbonate of lime, and be found in small quantities in the salt. If it be desired to remove this, it may readily be done by slightly acidifying the solution of chloride of sodium used for the first washing with muriatic acid, which, in passing through the salt-house, comes in contact with every particle of lime remaining in the salt, and renders it soluble and removes it with the other impurities. The second washing of the salt with the solution of pure chloride of sodium will remove from the salt every trace of acid left from the first washing. This additional process to remove the carbonate of lime is scarcely necessary in practice, because the carbonate of lime is utterly insoluble in water, exists in very small quantities, and has no injurious effect whatever on meat, &c.

The salt, thus refined and deprived of all foreign substances, is allowed to drain for a day or two in the salt-house, and when dry enough may be packed in barrels, &c., for the use of packing meat, &c., but for table use or for packing the best meat, should be spread on frames and placed in a drying-house, or otherwise dried, and then ground in mills to the requisite degree of fineness. When once dried, it will remain dry even in the dampest weather, thus showing the utter absence of all deliquescent and foreign salts.

My process depends for its efficiency on the passing through the salt of a liquor which will dissolve and thereby carry off the impurities, while being itself saturated with salt, it will not dissolve any more—or, in other words, using a saturated brine purer than the impure brine remaining in the interstices between the particles of salt. My process is therefore applicable to the purification of salt in a modified form by using brine fully saturated, but not free from impurities—that is, for instance, taking brine boiled down to the point of saturation, and just as it begins to deposit salt, and passing it through the salt in the salt-house. In so doing it will carry off a large quantity of the impurities without dissolving any salt, and will improve the salt considerably, but not render it as absolutely and chemically pure as the use of a pure solution of chloride of sodium will do.

This mode of applying my process may be easily used in making a salt inferior in quality, but more pure than the crude salt, at a very trifling cost.

Having thus described my improved process for the manufacture of salt, what I claim as my invention, and desire to secure by Letters Patent, is—

The combination of processes hereinbefore described, for the purification of common salt—to wit, washing common salt procured by the evaporation of salt-water containing chloride of calcium and other impurities, with a saturated solution of chloride of sodium or brine, rendered pure by the use of chemical reagents, substantially in the manner described, and the repeated use for that purpose of the same brine for an indefinite number of operations by treating it, after each process of washing the salt, with suitable chemical agents, whereby it is restored to its original purity.

In testimony whereof I have hereunto set my hand this 16th day of July, A. D. 1858.

H. PEMBERTON.

Witnesses:
W. BAKEWELL,
MARTIN G. CUSHING.